United States Patent [19]
Sortwell

[11] Patent Number: 5,935,425
[45] Date of Patent: Aug. 10, 1999

[54] CENTRIFUGE WITH ROTATABLE SCROLL AND MEANS TO MIX FLOCCULANT WITH FEED SLURRY

[75] Inventor: Edwin T. Sortwell, Wheaton, Ill.

[73] Assignee: Sortwell & Co., St. Simons Island, Ga.

[21] Appl. No.: 08/708,462

[22] Filed: Sep. 5, 1996

[51] Int. Cl.$^6$ .............................. B01D 17/12; B04B 1/20; B04B 11/02

[52] U.S. Cl. .......................... 210/87; 210/512.1; 494/10; 494/29; 494/52

[58] Field of Search ................................... 210/97, 198.1, 210/209, 360.1, 377, 512.1, 702, 787, 143, 709, 87; 494/1, 5, 10, 23, 27, 29, 52, 53

[56] References Cited

U.S. PATENT DOCUMENTS

| | | |
|---|---|---|
| 2,467,003 | 4/1949 | Bach . |
| 3,141,000 | 7/1964 | Turner ..................................... 252/360 |
| 3,228,594 | 1/1966 | Amero . |
| 3,601,318 | 8/1971 | Gehring et al. ...................... 239/416.2 |
| 3,666,663 | 5/1972 | Walker . |
| 3,836,126 | 9/1974 | Weltmer ................................... 259/95 |
| 3,967,778 | 7/1976 | Hunwick ................................... 494/29 |
| 4,039,348 | 8/1977 | Hunwick ................................... 494/27 |
| 4,206,052 | 6/1980 | Mandt ....................................... 210/49 |
| 4,298,160 | 11/1981 | Jackson ..................................... 494/27 |
| 4,372,851 | 2/1983 | Mandt ..................................... 210/199 |
| 4,539,120 | 9/1985 | Robinson ............................... 210/738 |
| 5,338,459 | 8/1994 | Hirose ..................................... 210/710 |
| 5,366,622 | 11/1994 | Geyer ...................................... 210/199 |
| 5,389,250 | 2/1995 | Wood et al. ........................... 210/194 |
| 5,458,777 | 10/1995 | Khatib .................................... 210/519 |

OTHER PUBLICATIONS

Attachment 1—Super–D–Canter, Continuous Solid Bowl Centrifuges, "How the Super–D–Canter Achieves Continuous Separation", Undated.
Attachment 2—Special Features, Conveyor Speed Variation and Automatic Control, Undated.
Attachment 3—Centridry™ process, Undated.
Attachments 4A–4F—Examples of prior art systems for flocculant addition, undated.

*Primary Examiner*—Joseph W. Drodge
*Attorney, Agent, or Firm*—Marshall, O'Toole, Gerstein, Murray & Borun

[57] ABSTRACT

A centrifuge such as a continuous solid bowl centrifuge, for example, includes a rotatable bowl for receiving a slurry, and defines a zone in which the slurry is accelerated. The centrifuge includes a device such as a slurry feed tube for delivering slurry to the acceleration zone and a device for delivering a plurality of individual streams of flocculant solution coterminating with the slurry delivery device in order to uniformly distribute flocculant solution to the slurry.

16 Claims, 2 Drawing Sheets

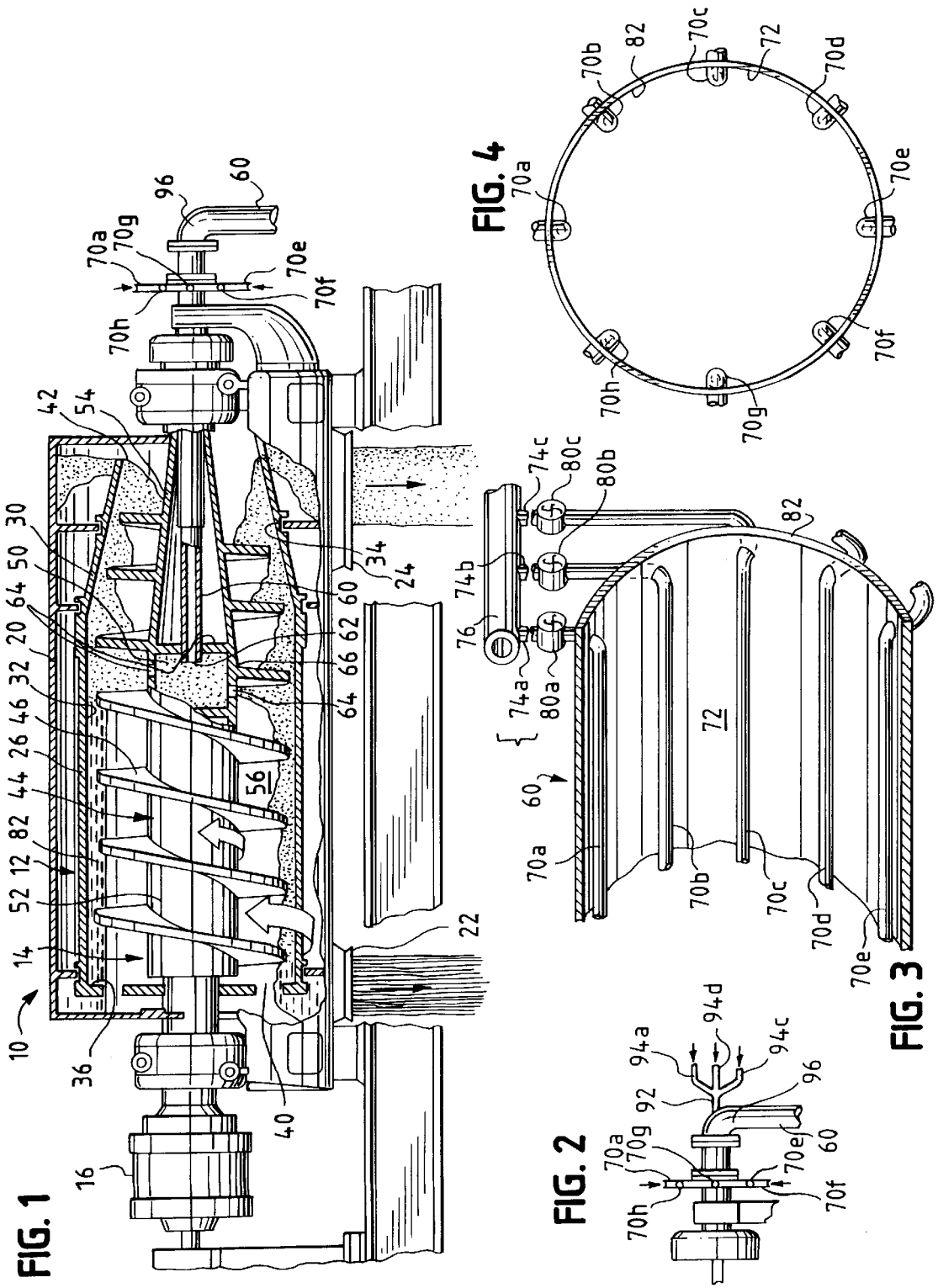

CENTRIFUGE WITH ROTATABLE SCROLL AND MEANS TO MIX FLOCCULANT WITH FEED SLURRY

BACKGROUND OF THE INVENTION

1. Field of the Invention

The invention relates generally to a device for separating solids from solids-containing liquids and, more specifically, the invention relates to a centrifuge for separating solids from a slurry aided by a flocculant.

2. Description of Related Technology

Various types of centrifuges have been used to separate solids from liquids in industrial and municipal applications for many years. Examples of dispersions requiring solids removal are paper mill wastes and municipal sewage. Such centrifuges operate continuously or batch-wise, and may take any of various forms.

Separation is often enhanced in aqueous systems by the use of water-soluble, long chain polymers (polyelectrolytes) referred to generically herein as "flocculants." Acrylamide polymers and copolymers are examples. A flocculant assists in coagulating and removing solids from water dispersions. The efficiency and performance of the flocculant is a function of the thoroughness of mixing of the flocculant with the feed slurry to achieve contact of solid particles with the flocculant polymer chains while reducing shear destruction of flocculated agglomerates.

Continuous solid bowl centrifuges ("CSBCs") have found wide acceptance. In general, a CSBC comprises a driven, rotatable solid bowl coaxial with and surrounding a driven rotatable scroll, which typically takes the form of a helix. Other forms of centrifuges may utilize a perforate basket or other element in place of a solid bowl and/or may be operated on a batch basis. The scroll contains an internal acceleration chamber which receives a solids-containing liquid (i.e, a slurry). The acceleration chamber has discharge ports communicating with a space defined between the inner bowl surface and the scroll.

A slurry feed tube delivers the solids-containing liquid to the acceleration chamber, where the slurry is accelerated toward the speed of the outer rotating bowl and discharges through the ports in the acceleration chamber into a standing wall of liquid held in place against the bowl surface by centrifugal force. If no flocculent is used, separation is effected by centrifugal force only.

Flocculants increase solid/liquid separation by molecular entanglement between the flocculants and the solids to be separated. A net-like structure is thought to assist particle coalescence and coagulation and resultant settling. Often, flocculants are charged positively or negatively to assist in particle-charge neutralization for improved coagulation and flocculation performance. Flocculants often have molecular weights in the millions or tens of millions, and solutions of flocculants may be very viscous and difficult to mix with the feed slurry.

Prior systems for delivering a flocculant solution to the slurry suffer from a number of disadvantages. Often, the flocculent solution is injected into the side of the slurry feed tube, typically upstream of the centrifuge. In one prior system, a single stream of flocculent solution is introduced to the feed slurry just as the feed slurry discharges from the slurry feed pipe into the acceleration chamber and then into the centrifuge bowl. This system typically results in a lack of effective distribution and mixing of the flocculant with the slurry solids. This is inefficient, since complete treatment and removal of fine and colloidal solid particles (called "capture") depend on flocculant molecules contacting all solids in the feed slurry. Contacting primarily large particles alone, and not treating the fine and colloidal solids, results in higher moisture content in centrifuge solids and/or incomplete capture of the fine and colloidal materials. Incomplete capture results in the presence of unwanted solids in the discharged clarified liquid (centrate).

In order to improve capture, lower flocculant concentrations may be used to increase the volume of flocculant solution to improve distribution, but this often results in partial formation of fragile flocs, which are destroyed by shear in acceleration, resulting in the presence of solids in the centrate.

In some prior systems, a flocculant is added to the slurry feed tube externally of the centrifuge, with or without the presence of static mixing elements in the feed slurry tube. In such cases, the flocculant solution is added from the side of the feed slurry, or concentrically therewith. While the improved mixing provided by the static mixer elements may improve solids/flocculant contact, this benefit may be offset due to floc shear during acceleration in the centrifuge. This approach is not always effective in improving performance, and may only be effective in older centrifuges, which provide relatively low slurry acceleration. On relatively high acceleration centrifuges this approach is generally not applicable because of increased floc shear and resultant floc destruction.

While the use of a single concentric tube for flocculant solution feed does not present significant plugging problems even when large solids are present in the slurry feed, the use of static mixing elements or other internal projections such as a flocculant feed tube extending radially into a slurry feed tube may result in serious plugging problems, and render this approach impossible. In order to avoid potential plugging, any lateral projections (i.e., any projections extending radially into or through the slurry feed tube feed line) must be avoided.

SUMMARY OF THE INVENTION

It is an object of the invention to overcome one or more of the problems described above.

Accordingly, the invention provides a centrifuge including a rotatable bowl and an acceleration zone for acceleration of slurry. Means for delivering slurry communicate with the acceleration zone, and means for delivering a plurality of individual streams of flocculant solution communicate with the acceleration zone for delivering a flocculant thereto. The flocculant delivery means terminate substantially coincidentally with the delivery means.

Further objects and advantages of the invention will become apparent to those skilled in the art from a review of the following detailed description with reference to the drawings and the appended claims.

BRIEF DESCRIPTION OF THE DRAWINGS

FIG. 1 is a cross-sectional elevational view of a continuous solid bowl centrifuge of the invention.

FIG. 2 is a fragmentary view of another embodiment of the centrifuge of FIG. 1.

FIG. 3 is a cut-away partial perspective view of a slurry feed pipe and a plurality of flocculant feed tubes of the centrifuge of FIG. 1.

FIG. 4 is an elevational view of the slurry feed pipe and flocculant feed tubes of FIG. 2 taken along line 4—4 of FIG. 3.

DETAILED DESCRIPTION OF THE INVENTION

Figure 5:
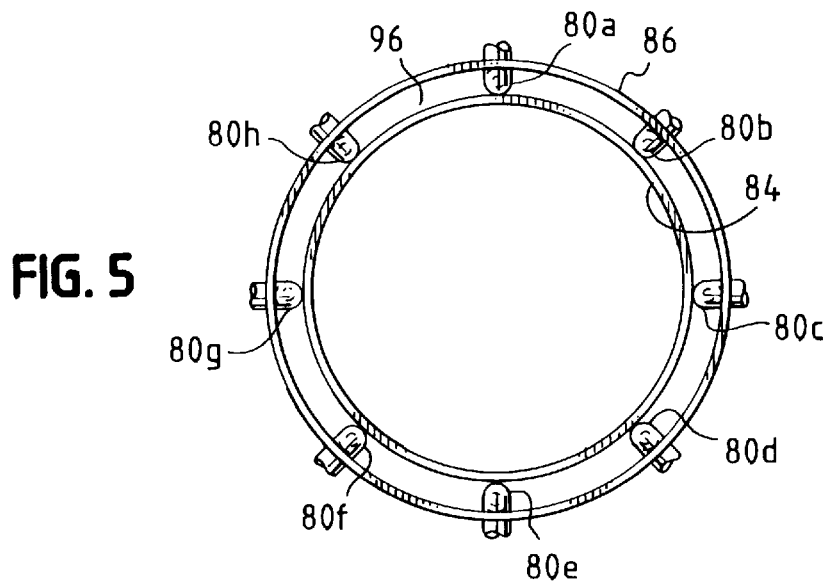
FIG. 5 is a cross-sectional view, similar to that of FIG. 4, of another embodiment of a slurry feed pipe and flocculant feed tubes useful in the invention.

The invention is applicable to a variety of types of centrifuges, whether continuous or batch, and will be described with reference to continuous solid bowl centrifuges ("CSBCs"). The following description is not intended to be limiting.

FIG. 1 illustrates a continuous solid bowl centrifuge of the invention, generally designated 10. The CSBC 10 includes a driven rotatable bowl, generally designated 12, coaxial with and surrounding a driven rotatable scroll, generally designated 14. The bowl 12 and the scroll 14 are driven by a prime mover/gearbox assembly 16. The bowl 12 and the scroll 14 typically rotate at slightly different rates.

The bowl 12 and scroll 14 are contained within an outer casing 20 having respective discharge ports 22 and 24 for clarified liquids and solids.

As shown in FIG. 1, the bowl 12 is generally circular in cross-section, and includes a cylindrical section 26 and a conical section 30 with the cross-section of the bowl 12 tapering toward the solids discharge port 24. An inner surface 32 of the bowl defines a "beach" 34 at the conical section 30. Adjustable dam plates 36 are disposed at the open end 40 of the cylindrical bowl section 26. A lip 42 is defined at the open end of the conical bowl section 30.

The scroll 14 has a body 44 defining a helical surface 46 extending outwardly therefrom, and is typically at least partially hollow. An acceleration chamber (or acceleration zone) 50 is defined within the hollow scroll body 44 at a location intermediate a cylindrical scroll section 52 and a conical scroll section 54. A space 56 is defined between the outer surface of the scroll body 44 and the inner surface 32 of the bowl, and is substantially uniform in depth throughout the length of the centrifuge.

A slurry feed tube 60 extends into the centrifuge through the conical scroll section 54 and terminates at the acceleration chamber 50. The tube 60 is preferably cylindrical in cross-section, and highly preferably is a right circular cylinder, as illustrated. The slurry feed tube 60 is coaxial with the scroll 14, but does not rotate. A discharge end 62 of the tube 60 may be maintained in position by a support wall 64 within the scroll body 44.

The acceleration chamber 50 includes discharge ports 64 formed in a scroll wall 66 to allow the feed slurry to be discharged from the acceleration chamber 50 by centrifugal force.

As best seen in FIGS. 3 and 4, a plurality of flocculant feed tubes 70a–h are disposed within the slurry feed pipe 60 about an inner peripheral surface 72 thereof. The tubes 70 terminate substantially coincidentally with the discharge end 62 of the slurry feed pipe 60 and are connected at their opposite ends 74a–h with a source of flocculant solution, such as a manifold 76. A flowmeter 80a–h is provided in each tube 70 for individually monitoring the flow in each tube. Means (not shown) may be provided for controlling flow rates in individual tubes, based on feedback from the flowmeters 80, if desired.

A typical CSBC equipped according to the invention may process from about 50 to about 300 gallons per minute of slurry and the bowl may accelerate the slurry, typically up to 1000 to over 3000 times the force of gravity by rotation, typically at a rate of about 1000 rpm to over 3000 rpm.

In operation, solids are continuously separated from the liquid phase by application of centrifugal force. Relatively dense solid particles are sedimented against the rotating bowl surface 32. The less dense liquid phase forms a concentric inner layer or "pond" 82 spaced from the surface 32. The adjustable dam plates 36 enable the depth of the liquid layer 82 to be varied.

The sedimented solid particles are continuously removed from the bowl 12 by the action of the scroll 14. The solids are "plowed" out of the "pond" 82 onto the conical "beach" 34 whereby the centrifugal force compacts the solids and expels surplus liquor. Solids are discharged over the lip 42 of the bowl and through the solids discharge port 24. Clarified liquid overflows the dam plates 36 situated at the opposite end of the bowl 12 and are expelled through the liquids discharge port 22.

According to the invention, flocculant solution is introduced into the feed slurry as the feed slurry exits the slurry feed tube 60 to the acceleration chamber 50. Multiple, individually controlled streams of flocculant solution are introduced into the feed slurry through individual tubes that will not increase the likelihood of slurry feed tube plugging and which will allow for the optimizing of flocculant solution concentration, while maintaining good distribution of the flocculant within the feed slurry. This allows complete distribution of flocculant molecules with all of the feed slurry solids immediately before discharge from the scroll without premature floc formation that can lead to floc shear on acceleration.

Additionally, flocculant solution concentration adjustments can be made to accommodate changes in slurry feed rates to the centrifuge while maintaining mixing efficiency but minimizing shear on acceleration.

Figure 6:
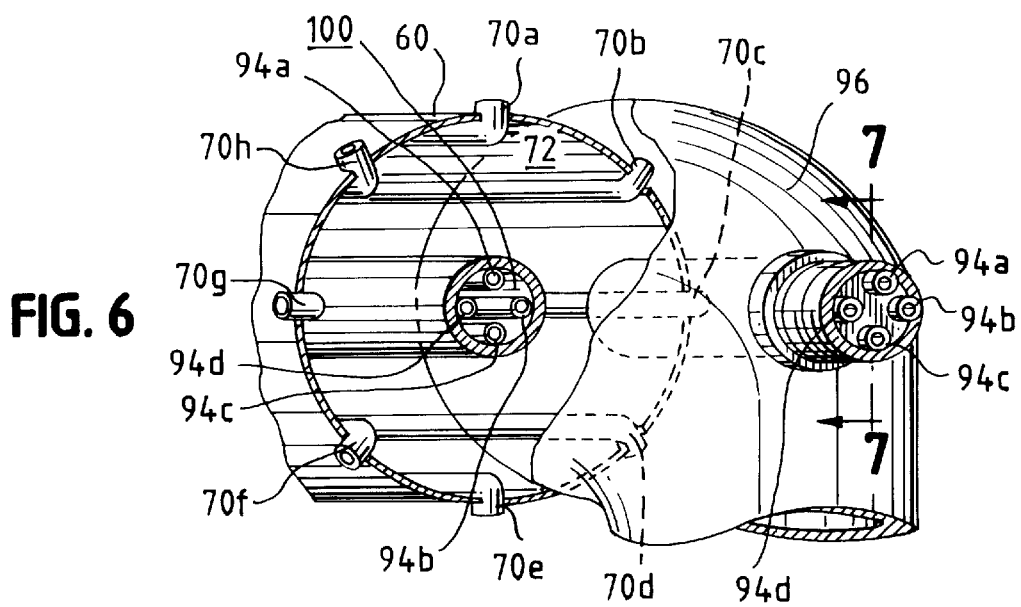
FIG. 6 is a cut-away, partial perspective view of another embodiment of a slurry feed pipe and flocculant feed tubes useful in the invention.

With reference to FIG. 3, the flocculant solution introduction configuration is illustrated. Individual flocculant solution tubes 70 are disposed against the inner wall 72 of the slurry feed tube 60, but since there are no projections radially across the slurry feed tube cross-section, the possibility of slurry feed tube plugging is minimized. One objective of the invention is to provide multiple, thin streams of flocculant solution around the periphery of the slurry feed tube 60 (and, optionally, along the central axis of the slurry feed tube, as shown in FIGS. 2 and 6) without radial projections within the slurry feed tube 60 itself.

Another objective is to divide the flocculant solution into a sufficient number of thin streams to allow the use of higher flocculant solution concentrations, which are generally characterized by relatively high viscosity. In this way, the increased viscosity of the flocculant solution does not negatively affect mixing efficiency with all the solids in the feed slurry within the small time available for mixing between the slurry feed tube discharge and a quiescent pool formation within the bowl.

Flocculant solution flow through each small tube is monitored to ensure maintenance of optimum centrifuge performance. Any of a variety of flow sensing devices known to those familiar with the art may be used to individually control flow rate of the flocculant solution.

In FIG. 3, the flocculant feed tubes 70 are individually disposed along with inner peripheral surface 72 of the slurry feed pipe 60 and extend outwardly through a tube wall 82 toward their respective introduction ends 74. In this way, radial projections into the slurry feed pipe are minimized, as best seen in FIG. 4. In an alternative embodiment as shown in FIG. 5, the slurry feed pipe 60 comprises two concentric tubes 84 and 86 defining an annular space 90 with the individual flocculant feed tubes 70 extending therethrough.

The flocculant feed tubes terminate coincidentally with the discharge end 64 of the slurry feed pipe 60. In this way, interference with flow is further minimized, and manufacturing of the assembly is facilitated.

Figure 7:
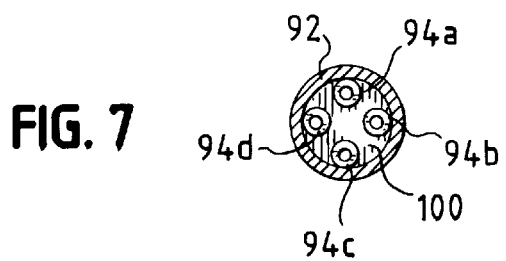
FIG. 7 is a cross-sectional view of the support tube and flocculant feed tubes of the embodiment of FIG. 6, taken along line 7—7.

FIGS. 2, 6, and 7 illustrate a further embodiment wherein a support tube 92 is disposed concentrically with the larger slurry feed pipe 60. A plurality of flocculant feed tubes 94a–d extend through an elbow 96 of the slurry feed pipe 60 and are disposed substantially uniformly about an inner peripheral surface 100 of the support tube 92, and terminate at a discharge end thereof (not shown). The space surrounding the flocculant feed tubes 94 within the support tube 92 is closed at both ends of the support tube 92, as best seen in FIGS. 6 and 7.

In a typical CSBC installation made according to the invention, the slurry feed tube 60 may have an inner diameter of about four inches to six inches, and each flocculant feed tube 70 and 94 diameter of about $\frac{1}{8}$ inch to $\frac{3}{16}$ inch. If a support tube 92 for supporting the flocculant feed tubes 94 is used, it may conveniently have an outer diameter of 1 inch to 1.5 inch, or greater depending on the capacity of the centrifuge.

Typically, the inventive centrifuge will utilize four to sixteen flocculant feed tubes 80, regardless of whether central flocculant feed tubes 94 are used. If central flocculant feed tubes 94 are used in addition to peripheral flocculant feed tubes 80, the number of feed tubes along the outer periphery of the slurry feed tube may but need not necessarily be reduced. For example, the embodiment of FIGS. 2 and 6 utilize eight peripheral flocculant feed tubes 80 and four central flocculant feed tubes 112.

Other objects and advantages of the invention will be apparent to those skilled in the art from the foregoing detailed description, taken in conjunction with the drawings and the appended claims.

I claim:

1. A centrifuge for separating solids from a slurry, comprising:

a rotatable bowl for receiving said slurry;

an acceleration zone communicating with said bowl;

means for introducing said slurry to said acceleration zone for acceleration of said slurry;

means for introducing and controlling a plurality of individual streams of flocculant solution to said acceleration zone for distribution into said slurry;

said slurry introducing means comprising a slurry feed tube and said flocculant solution introducing means comprising a plurality of individual first flocculant feed tubes substantially coterminating with said slurry feed tube; and means for individually monitoring and controlling flow of said flocculant-containing liquid through each said first flocculant feed tube.

2. The centrifuge of claim 1 wherein said slurry feed tube and said first flocculant feed tubes terminate at said acceleration zone.

3. The centrifuge of claim 1 wherein said slurry feed tube is cylindrical and defines an inner peripheral surface.

4. The centrifuge of claim 3 wherein said first flocculant feed tubes are disposed on said inner peripheral surface.

5. The centrifuge of claim 1 wherein said slurry feed tube comprises two concentric walls defining a space between said walls, and said first flocculant feed tubes are disposed between said walls.

6. The centrifuge of claim 1 comprising four to sixteen first flocculant feed tubes.

7. The centrifuge of claim 1 further comprising a plurality of second flocculent feed tubes for delivering a flocculant-containing liquid to said acceleration zone and a support tube for supporting said second flocculant tubes within said slurry feed tube, said support tube and said second flocculant feed tubes being coaxial with said slurry feed tube, said second flocculant feed tubes being parallel with said support tube and being disposed within said support tube substantially uniformly about the periphery thereof, each of said support tube and said second flocculant feed tubes terminating substantially coincidentally with each other and with said slurry feed tube and said first flocculant feed tubes.

8. The centrifuge of claim 7 further comprising means for individually monitoring and controlling flow of said flocculant-containing liquid through each said second flocculant feed tube.

9. A centrifuge for separating solids from a slurry, comprising:

a driven, axially extending rotatable bowl surrounding a driven rotatable scroll coaxial with said bowl, said bowl and said scroll defining a space therebetween, said scroll having a body defining an internal chamber communicating with said space for receiving said slurry, a slurry feed tube coaxial with said bowl and said scroll and communicating with said chamber for delivering said slurry to said chamber, a plurality of first flocculant feed tubes communicating with said chamber for delivering a flocculant-containing liquid to said chamber, said first flocculant feed tubes being parallel with said slurry feed tube and disposed substantially uniformly about the periphery thereof and terminating substantially coincidentally therewith, and means for individually monitoring and controlling flow of said flocculant-containing liquid through each said first flocculant feed tube.

10. The centrifuge of claim 9 wherein said slurry feed tube is cylindrical and defines an inner peripheral surface.

11. The centrifuge of claim 10 wherein said first flocculant feed tubes are disposed on said inner peripheral surface.

12. The centrifuge of claim 9 wherein said slurry feed tube comprises two concentric walls defining a space between said walls, and said first flocculant feed tubes are disposed between said walls.

13. The centrifuge of claim 9 comprising four to sixteen first flocculant feed tubes.

14. The centrifuge of claim 11 further comprising a plurality of second flocculant feed tubes for delivering a flocculant-containing liquid to said chamber and a support tube for supporting said second flocculant tubes within said slurry feed tube, said support tube and said second flocculant feed tubes being coaxial with said slurry feed tube, said second flocculant feed tubes being parallel with said support tube and being disposed within said support tube substantially uniformly about the periphery thereof, each of said support tube and said second flocculant feed tubes terminating substantially coincidentally with each other and with said slurry feed tube and said first flocculant feed tubes.

15. The centrifuge of claim 14 further comprising means for individually monitoring and controlling flow of said flocculant-containing liquid through each said second flocculant feed tube.

16. The centrifuge of claim 9 comprising a continuous solid bowl centrifuge.

* * * * *